United States Patent

Class et al.

[11] Patent Number: 5,603,391
[45] Date of Patent: Feb. 18, 1997

[54] DAMPER VALVE FOR POWER STEERING COUPLER

[75] Inventors: Jürgen Class, Illinngen; Ulrich Asbrand, Remmshalden, both of Germany

[73] Assignee: Mercedes-Benz AG, Germany

[21] Appl. No.: 498,753

[22] Filed: Jul. 6, 1995

[30] Foreign Application Priority Data

Jul. 6, 1994 [DE] Germany ................. 44 23 658.1

[51] Int. Cl.⁶ .................. B62D 5/06; F16K 47/00
[52] U.S. Cl. ..................... 188/266; 188/322.13
[58] Field of Search ............... 188/281, 282, 188/322.15, 322.13, 322.22, 322.14, 266; 280/90–91, 272, 40, 96; 180/132, DIG. 4, 133–139, 140, 141

[56] References Cited

U.S. PATENT DOCUMENTS

| 3,627,346 | 12/1971 | Dorner et al. ............... 188/322.15 |
| 3,889,787 | 6/1975 | Zehring et al. |
| 4,795,008 | 1/1989 | Joseph et al. |
| 5,404,961 | 4/1995 | Huber ........................ 180/132 |

FOREIGN PATENT DOCUMENTS

| 2002112 | 7/1971 | Germany. |
| 7238312 | 2/1973 | Germany. |
| 2636490 | 5/1977 | Germany. |
| 7725888 | 8/1977 | Germany. |
| 7812642 | 8/1978 | Germany. |
| 4106310 | 2/1990 | Germany. |
| 9103740 | 3/1991 | Germany. |
| 4029156 | 4/1991 | Germany. |
| 4323179 | 11/1994 | Germany. |
| 2279630 | 1/1995 | United Kingdom. |

OTHER PUBLICATIONS

Search Report from British Patent Office dated Sep. 28, 1995.

*Primary Examiner*—Douglas C. Butler
*Attorney, Agent, or Firm*—Evenson, McKeown, Edwards & Lenahan P.L.L.C.

[57] ABSTRACT

The invention relates to a damper valve for use on a coupler for hydraulic lines, in particular those which connect a hydraulically actuated servomotor of a servo control to a servo valve. According to the invention, all the elements having a damping effect are arranged captively in the coupler.

14 Claims, 6 Drawing Sheets

DAMPER VALVE FOR POWER STEERING COUPLER

BACKGROUND AND SUMMARY OF THE INVENTION

The invention relates to a damper valve for couplings for hydraulic lines, in particular those connecting a hydraulically actuated servomotor displacement assembly of a servo control to a servo valve. The damper valve according to the invention has an aperture-disc-like valve carrier whose apertures through which hydraulic medium flows can be controlled by means of small valve spring plates fastened to the end face of the carrier part by bolts, and/or spring-mounted valve plates.

In order to minimize the forces which must be applied by the driver of a motor vehicle when actuating the vehicle steering system, today's vehicles (at least passenger cars) are typically equipped with a hydraulically actuated power steering system. In this context, German patent document DE-A 40 29 156 discloses an arrangement in which a dual-action piston-cylinder assembly (which serves to generate an auxiliary hydraulic force) also acts as a steering damper. For this purpose, damper elements are arranged in the lines between the piston/cylinder assembly and the servo valve, so as to connect the piston/cylinder assembly to a hydraulic pressure source or a relatively pressureless hydraulic reservoir, in a controllable manner. However, this structure is comparatively complicated. The same applies to a similar arrangement described in German patent document DE-A 41 06 310.

According to an unpublished German patent application P 43 23 179.9, it was proposed to arrange the damper valves on an aperture-disc-like carrier whose apertures (through which hydraulic medium flows) can be controlled by means of small valve plates fastened by bolts to the end face of the valve carrier, and/or spring-mounted valve plates. In this case, provision is made for the aperture-disc-like valve carrier to be tensioned in the manner of a spacer ring or a spacer disc between a bearing surface of a connector arranged on the housing of the servo valve or the piston/cylinder assembly and a counter-bearing surface of the connection part of the line which can be connected to the connector. The assembly can be substantially simplified by these measures.

German patent document DE 78 12 642 U1 discloses a nonreturn valve for aerating and venting fuel tanks, which has a two-part housing arranged between two line parts. One housing half must be connected to the one line part, and the other must be connected to the other line part. (The connecting means is not illustrated in detail.) When the housing parts are fitted together, an annular membrane is inserted between them so that its outer circumference is held firmly in the housing in an inner circumferential groove remaining between the housing halves. This annular membrane interacts with an insert which serves as a valve seat body, and is anchored firmly and captively in one housing half.

In this known arrangement, faulty assembly is very possible due either to a failure to insert the annular membrane between the housing halves when they are joined together on the one hand, or assembly of the housing between the lines in an incorrect direction on the other.

The object of the present invention is to provide an improved damper valve of the type specified above.

This object is achieved according to the invention, by arranging the valve carrier firmly or captively on the line-side connection part and arranging the small valve spring plates and/or valve plates captively on the valve carrier. The invention is based on the general concept of integrating the damper valves in the line-side connection parts of the hydraulic lines so that the valves are connected captively to the connection parts and are thus necessarily arranged correctly during the assembly of the hydraulic system.

According to a preferred embodiment of the invention, the connection part is designed essentially in the shape of a cylindrical cup, with an opening at one end. Radial openings, spaced axially from the open end, are arranged axially between an external thread on the connection part and a radial flange at the other end, and communicate via openings in the aperture-disc-like valve carrier with the above-mentioned end-face opening. Connection parts of this type can be combined with hydraulic lines which have rings at their ends, which rings can be fitted axially onto the connection parts and have an annular groove that is open towards the inner circumference of the ring, communicates with the hydraulic line, and is capable of communicating via said annular groove with the radial openings in the connection part. During the assembly of the hydraulic system, the connection parts then serve as holding screws for the above-mentioned rings, sealing rings being arranged on both sides of the ring in order to seal off, on the one hand, the joint between the ring and the flange of the connection part and, on the other hand, the joint between the ring and the housing, connected to the hydraulic line, of the respective hydraulic system part, for example, servo valve or servomotor.

In a preferred embodiment, the connection part can be fitted together, for example by welding, from two parts, one part forming the axially closed end of the connection part and the other part being formed integrally with the aperture-disc-shaped valve carrier.

Other objects, advantages and novel features of the present invention will become apparent from the following detailed description of the invention when considered in conjunction with the accompanying drawings.

DETAILED DESCRIPTION OF THE PREFERRED DRAWINGS

Figure 1:
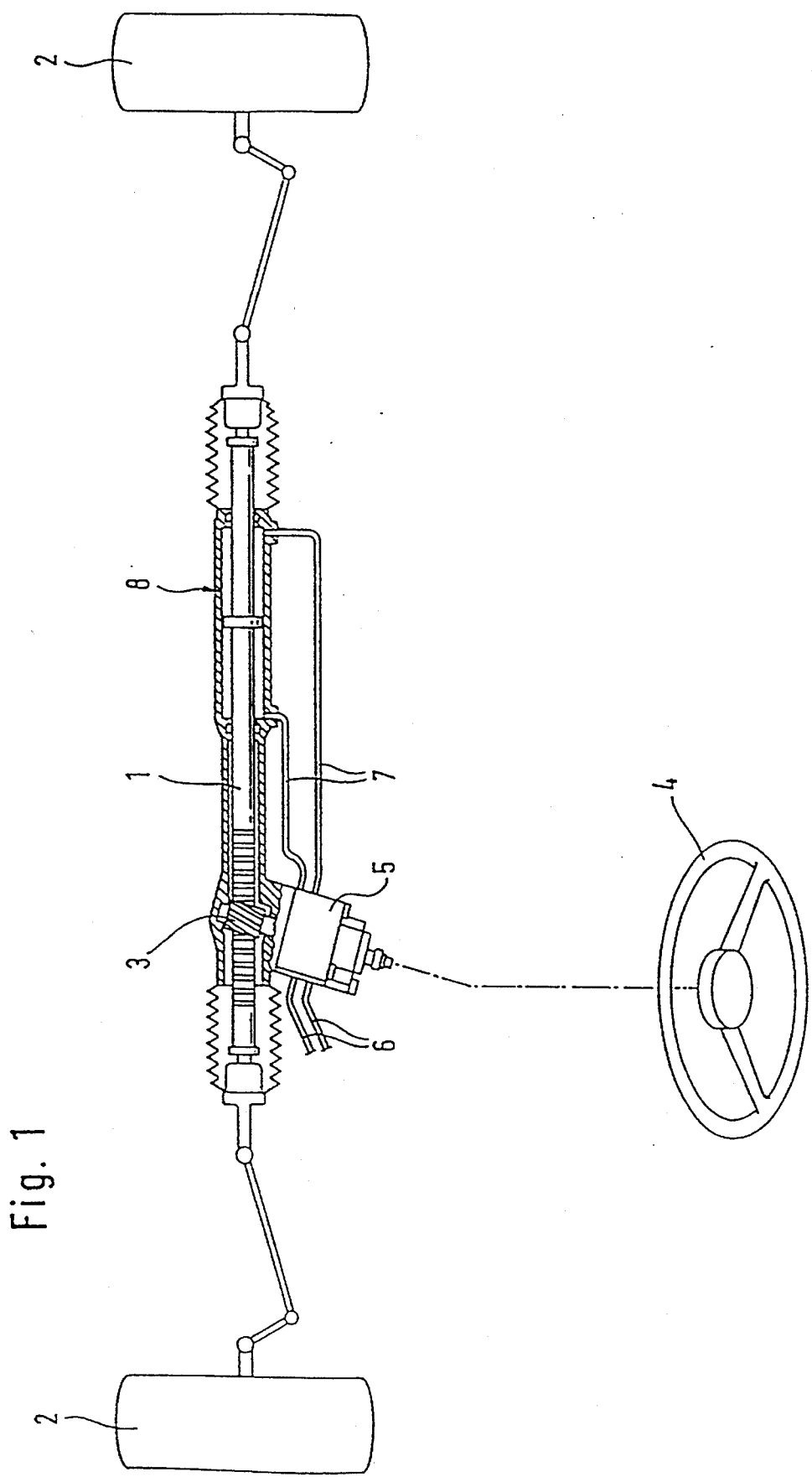
FIG. 1 shows a diagrammatic overall view of a toothed-rack steering system supported by a hydraulic servomotor.

In FIG. 1, a toothed rack 1, which is connected to the steered wheel of a motor vehicle in a known manner via track rods or other steering linkages, is driven by a pinion 3 which, in turn, is coupled to and driven by the steering wheel 4 of the motor vehicle. The drive transmission between the steering wheel 4 and the pinion 3 actuates a hydraulic servo valve 5 depending on the direction and magnitude of the torques transmitted between the steering wheel 4 and the pinion 3. The servo valve 5 is connected, on the one hand, via lines 6 to a source of compressed oil and to a relatively pressureless oil reservoir (not illustrated) and, on the other hand, via lines 7 to the operating chambers of a dual-action piston/cylinder assembly 8 provided as a servomotor, whose piston rod is firmly or integrally connected to the toothed rack 1 in the example illustrated.

By means of the servo valve 5, a pressure difference which is dependent on the torque transmitted between the steering wheel 4 and the pinion 3 can be generated in the two chambers of the piston/cylinder assembly 8 in such a way that the steering forces which must be applied by the driver at the steering wheel 4 are minimized owing to the hydraulic auxiliary force caused by the pressure difference.

The piston/cylinder assembly 8 also serves as a steering damper. For this purpose, damper valves are provided on the cylinder-side and/or servo valve-side connections of the lines 7. The arrangement and design of such damper valves will be explained further below with reference to FIGS. 2 to 5.

Figure 2:
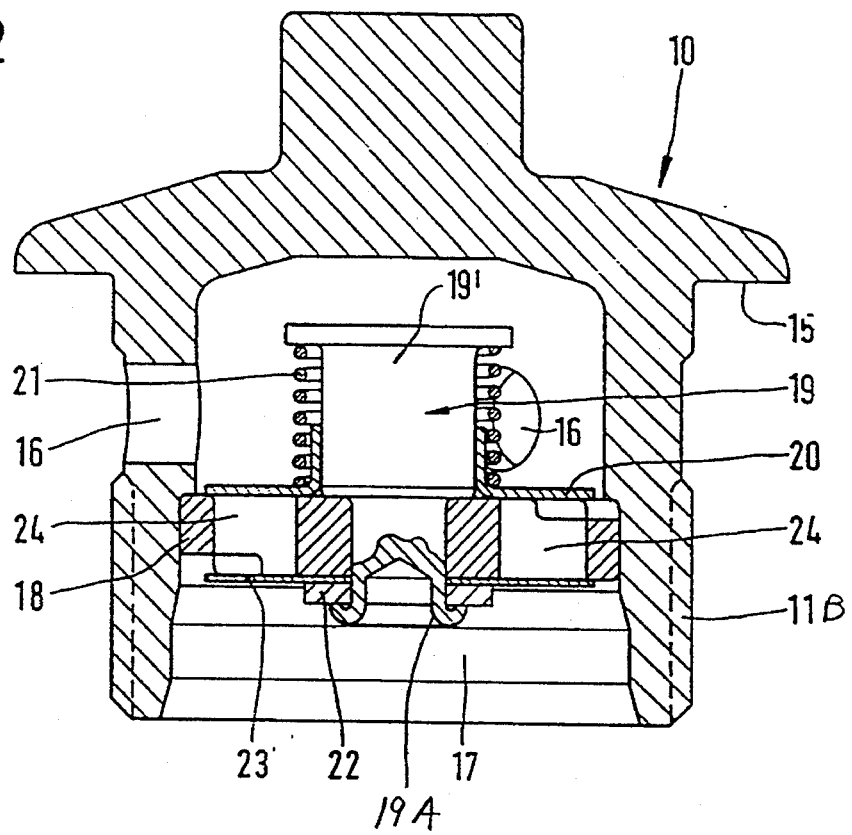
FIGS. 2, 3, 4 and 5 show sectional diagrams of different hollow-core screw-like connection parts for the hydraulic lines connecting the servo valve and the servomotor.
Figure 2:
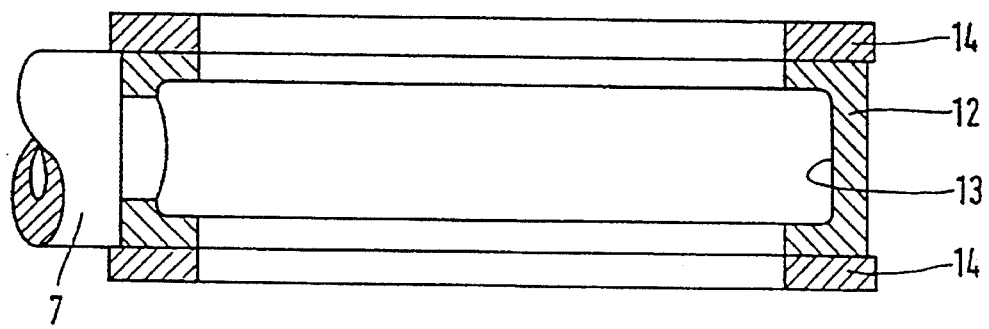
Figure 2:
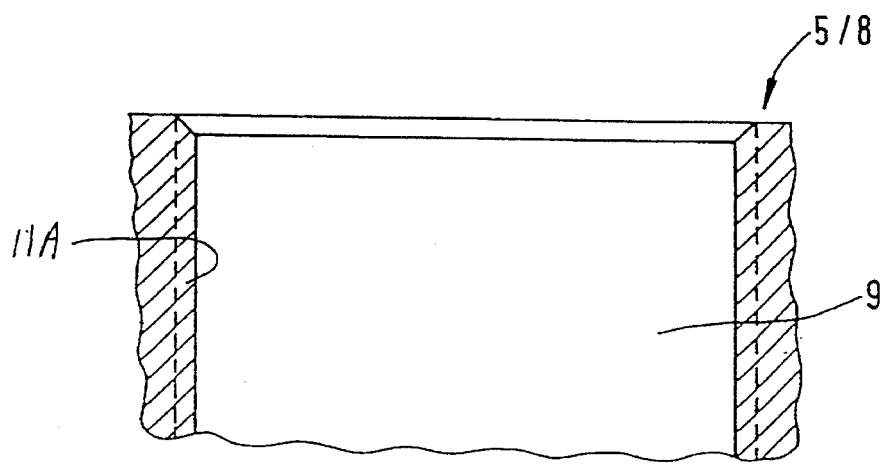

As shown in FIG. 2, a connection opening 9 is arranged on the housing of the servo valve 5 or on the piston/cylinder assembly 8 (FIG. 1) with an internal thread 11A into which a hollow-core screw-shaped connection part 10 for the line 7 (to be connected) can be screwed by means of an external thread 11b arranged thereon.

At its end to be connected to the connection part 10, the line 7 has a ring 12 which can be fitted onto the connection part 10, with an annular groove 13 which is open towards the inner circumference and communicates with the line 7 via an opening in the ring 12. In the assembled state, sealing rings 14 arranged on the end faces of the ring 12 seal the connections between the ring 12 and the housing having the connection opening 9 on the one hand, and a flange 15 arranged on the connection part 10 on the other.

Radial openings 16 are arranged in the connection part 10 in the region of the annular groove 13 of the ring 12, so that the line 7 can communicate via the annular groove 13 and the radial openings 16 with the interior of the hollow-core screw-shaped connection part 10, and accordingly with the connection opening 9 which is connected to the interior of the connection part 10 via its end-face opening 17.

An aperture-disc-like valve carrier 18 is fastened firmly, for example by friction-fit, in the connection part 10 axially between the end-face opening 17 and the radial openings 16.

Arranged in an axial central bore in the valve carrier 18 is a bolt 19 which, on the side of the valve carrier 18 facing the radial openings 16, forms a journal 19' which has a diameter greater than that of the central opening in the valve carrier 18 and has a flange-like head.

An annular disc-shaped valve body 20 is guided and slidable on the journal 19' by means of a cylindrical annular web molded onto its inner circumference. A helical compression spring 21 tensioned between the flange-like head of the journal 19' and the annular disc-shaped part of the valve body 20, biases the valve body 20 against the end of the valve carrier part 18 (the upper end in FIG. 2).

The bolt 19 has a rivet-like head or flange 19A, which fastens an annular disc 22 and small valve spring plates 23, tensioned axially between the annular disc 22 and the facing end of the valve carrier part 18, on its other end.

The valve body 20 and the small valve spring plates 23 interact with axial bores 24 in the valve carrier 18, whose openings are arranged or designed in such a way that, even if the valve body 20 and the small valve spring plates 23 rest on the valve carrier part 18 in the closed position, a residual cross-section still remains free for the passage of compressed oil.

Depending on the flow direction of the compressed oil, either the valve body 20 or the small valve spring plates 23 assumes its closed position, thus generating throttle resistance which is dependent on the flow direction, and which seeks to damp movements of the compressed oil. A desired damping effect can be achieved by adjusting the dimensions of the cross-sections of the axial bores 24, the design of their openings, the spring characteristics, the number of the small valve spring plates 23 and the strength of the helical compression spring 21. The spring or bending characteristics of the small spring plates 23 are additionally influenced by the size of the diameter of the annular disc 22 which, however, may also be omitted, if appropriate, if the end of the bolt 19, which is the lower end in FIG. 2, directly fastens the small spring plates 23.

Figure 3:
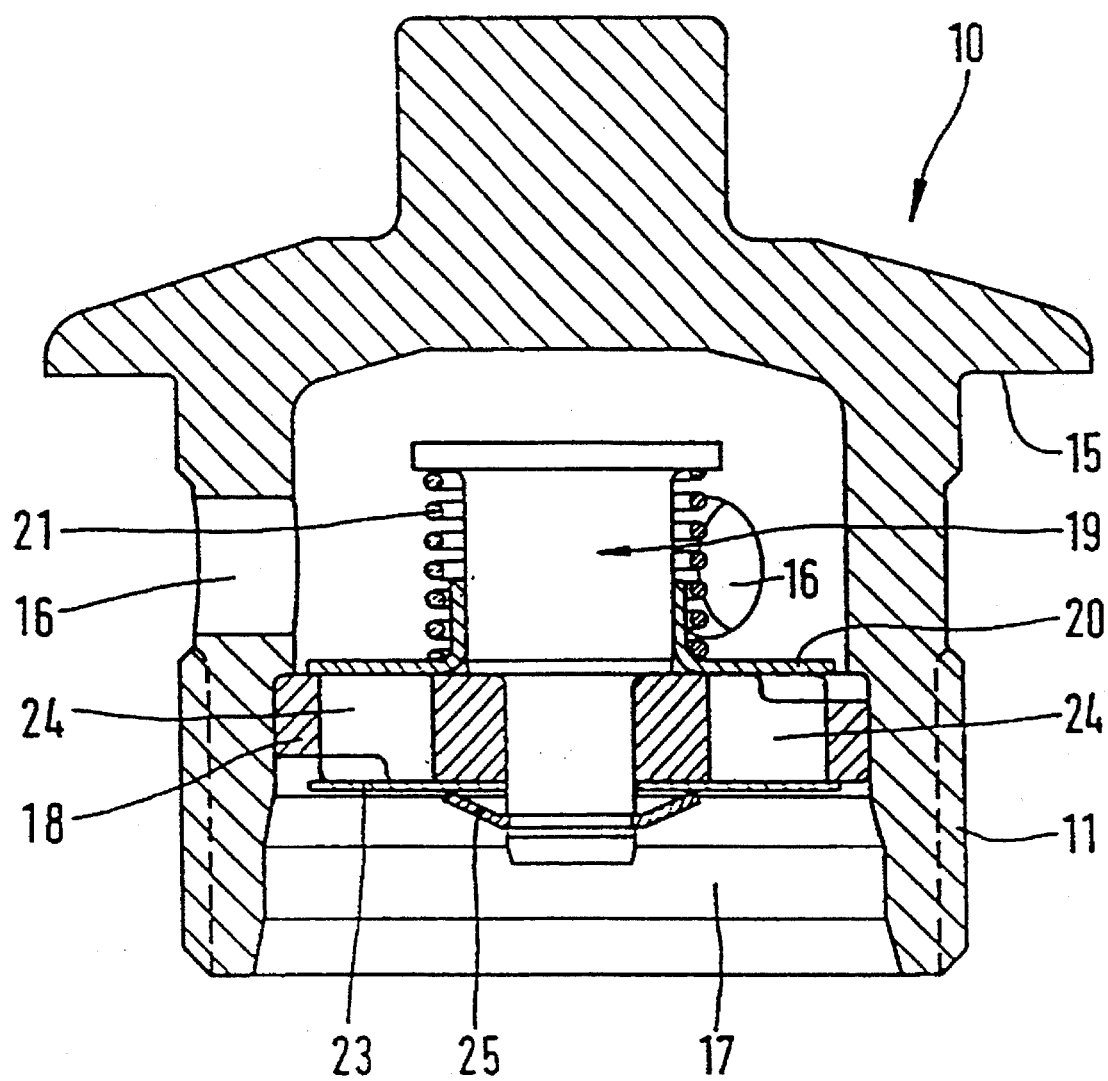

In the embodiment according to FIG. 3, the bolt 19 is fastened by means of a spring clip 25, which can be inserted in an annular groove provided for this purpose, at the lower end of the bolt 19, and is essentially C-shaped in the axial view of the bolt 19. The spring clip 25 is otherwise designed such that it is tensioned against the small valve spring plates 23 in the axial direction of the bolt 19 in the manner of a plate spring.

Figure 4:
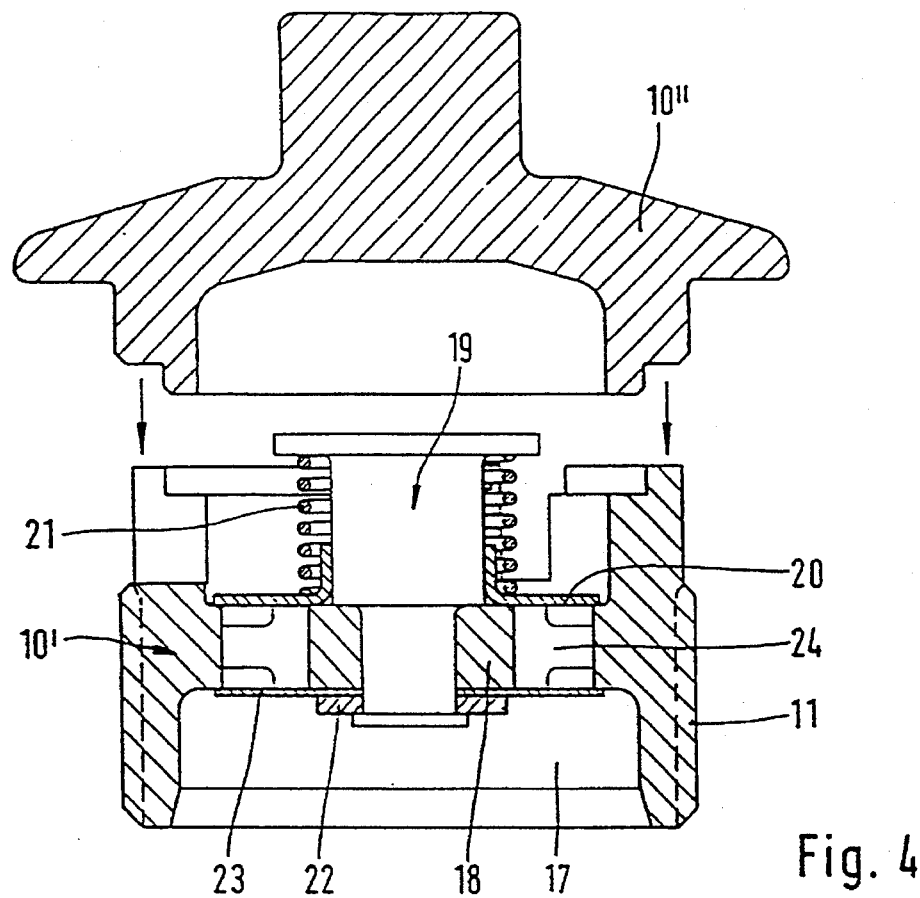
Figure 5:
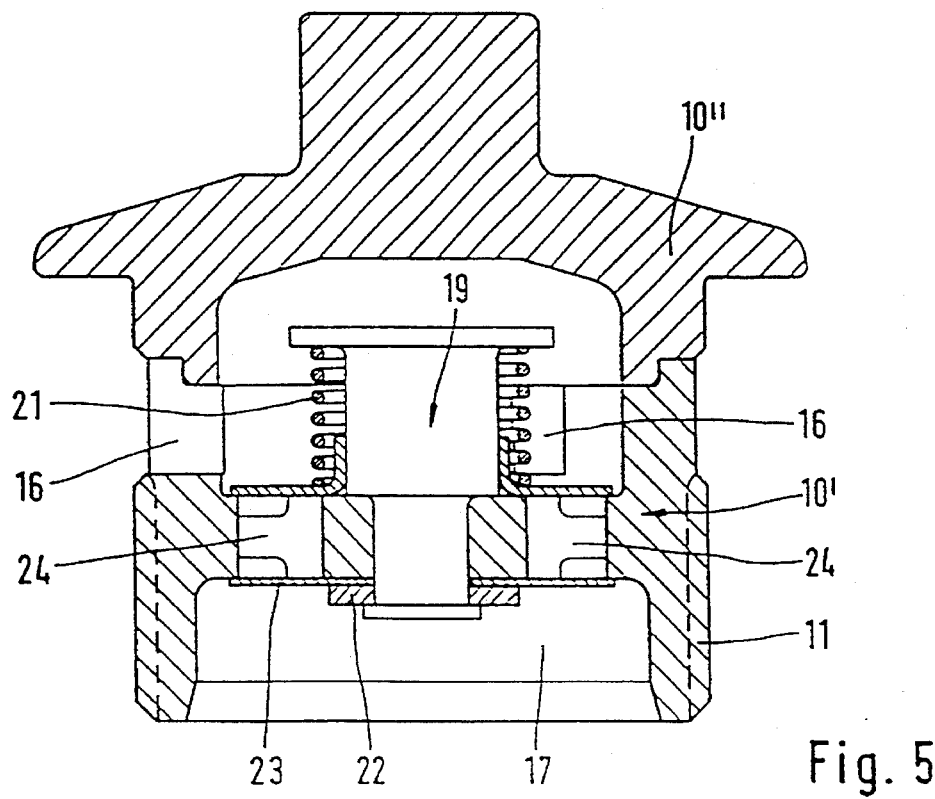

In the embodiment illustrated in FIGS. 4 and 5, the connection part 10 comprises two pieces which are illustrated separately in FIG. 4 and fitted together in FIG. 5. The two pieces can be connected by welding.

In this embodiment, the valve carrier 18 is formed integrally with the partial piece 10' of the connection part 10 having the external thread 11. The manufacture can be effected, for example, by powder metallurgy methods. The other partial piece 10" can be produced in basically the same manner.

The connection parts 10 illustrated in FIGS. 2 and 3 and/or their valve carrier bodies 18 can also be manufactured by powder metallurgy.

Figure 6:
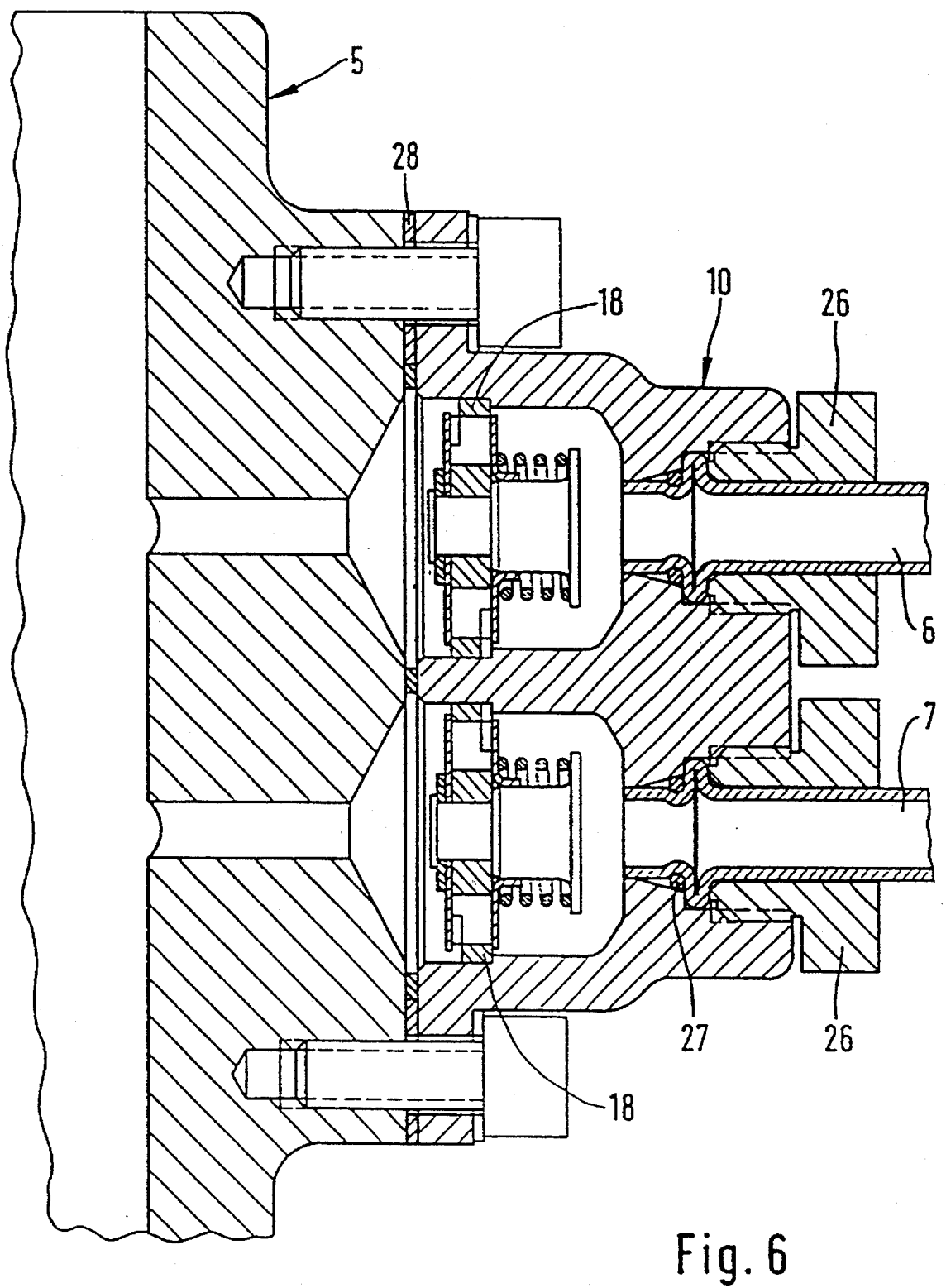
FIGS. 6 to 7 show sectional diagrams of flange-like connection parts.

In the embodiment of FIG. 6, the connection part 10 is designed as a flange part, specifically in such a way that the lines 6 and 7 (cf. FIG. 1) are fastened jointly on the housing of the servo valve 5. For this purpose, the flange part 10 has two stepped bores which are parallel to one another and whose sections with the larger diameters each receive a valve carrier part 18 with the associated valve elements, as shown by way of example in FIGS. 2 and 5. Adjoining the sections with the narrower diameter in each case is a threaded bore into which the lines 6 and 7 can be screwed with corresponding screw inserts 26, a flange-like annular bead on the lines 6 and 7 and a sealing ring 27 being clamped in each case axially between the screw inserts 26 and an annular step in the transition region between the threaded bores and the adjoining bores of the connection part 10.

A sealing shim 28 (made of a sheet-metal or an elastomer) serves to seal the flange-like connection part 10 on the housing of the servo valve 5.

Figure 7:
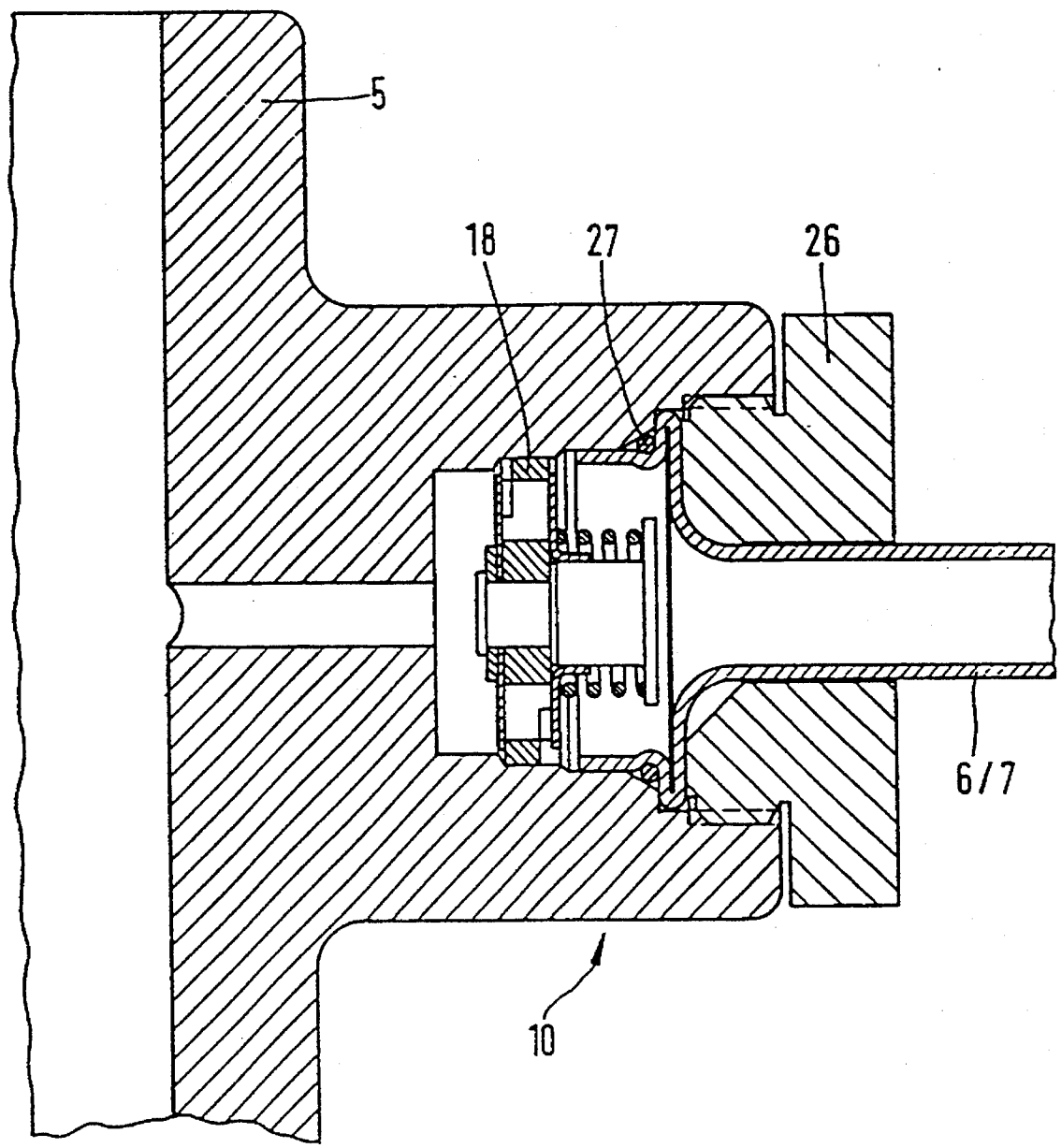

In the embodiment according to FIG. 7, the connection part 10 is molded onto the housing of a hydraulic assembly, for example, the servo valve 5, and captively receives the valve carrier part 18 with the valve elements. The line 6 or 7 is fastened in this connection part 10 by means of a screw insert 26, a flange-like annular bead on the line 6 or 7 again being tightly tensioned, together with a sealing ring 27 or the like, axially between the screw insert 26 and an annular step on the connection part 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for connecting hydraulic components in a vehicle power steering system, comprising:

a hydraulic line;

a coupler connected to said hydraulic line, said coupler having a path for flow of hydraulic medium therethrough, and a threaded portion for connecting said coupler in hydraulic communication between said hydraulic line and a hydraulic component;

a valve carrier having apertures through which hydraulic medium flows and a valve closure arrangement for damping a flow of hydraulic medium through said apertures, said valve carrier being integrated captively into said coupler and mounted in a fixed position relative thereto, whereby correct assembly of said hydraulic components is assured.

2. Apparatus according to claim 1 wherein said hydraulic line connects a hydraulically actuated servomotor of a servo control device to a servo valve.

3. Apparatus according to claim 1 wherein the coupler comprises a generally cylindrical cup-shaped member which is open at a first end and closed at a second end thereof, said cup-shaped member having an external threaded portion at said first end and a radially extending flange at said second end, and radial openings arranged axially between said threaded portion and said radial flange which communicate via the apertures in the valve carrier with the end-face opening.

4. Apparatus according to claim 1 wherein said valve carrier comprises:

a central axial bolt arranged thereon;

at least one small valve spring plate which is held by said axial bolt at a central position on one end of said valve carrier, and which interacts with the apertures in the valve carrier to regulate said flow of hydraulic medium therethrough;

an annular plate-shaped valve body which is slidably mounted on said axial bolt at an end of the said valve carrier opposite said at least one small valve spring plate, and which interacts with the apertures in said valve carrier to further regulate said flow of hydraulic medium therethrough; and a helical compression spring mounted on said axial bolt, which biases the valve body against the valve carrier and is supported on a flange head of said axial bolt.

5. Apparatus according to claim 4 wherein the axial bolt has an end thereof which is received in a central bore of said valve carrier, and said annular plate-shaped valve body is mounted on a portion of said axial bolt which has a larger diameter than the end of the axial bolt received in a central bore in the valve carrier.

6. Apparatus according to claim 5 wherein said end of the axial bolt which is received in said central bore of the valve carrier comprises a rivet which fastens at least on small valve spring plate.

7. Apparatus according to claim 6 wherein the rivet fastens an annular disc which interacts with a central region of the valve carrier, and axially tensions the small valve spring plate.

8. Apparatus according to claim 4 wherein the axial bolt is fastened by a spring clip in a central bore in the valve carrier.

9. Apparatus according to claim 1 wherein the coupler comprises two pieces which are welded together, one piece forming a closed end of the coupler, and the other piece having the valve carrier integrated captively therein.

10. Apparatus according to claim 1 wherein components of the coupler and the valve carrier comprise powdered metal.

11. Apparatus according to claim 1 wherein the coupler comprises a flange part on which said hydraulic line is fastened.

12. Apparatus according to claim 11 wherein the flange part is attached to a flange piece which, in turn, serves as a fastener to a hydraulic assembly.

13. Apparatus according to claim 1 further comprising a second damper valve arranged parallel to said damper valve in the coupler.

14. A vehicle power steering hydraulic circuit comprising:

a hydraulically actuated servo motor;

a hydraulic servo valve;

at least one hydraulic line connecting said servomotor in hydraulic communication with said servo valve;

a coupler having a path for flow of hydraulic medium therethrough, and a threaded portion for connecting said coupler in hydraulic communication between said hydraulic line and one of said servomotor and said hydraulic valve, said coupler being integrated with one of said hydraulic line, said servomotor and said servo valve;

a valve carrier having apertures through which hydraulic medium flows and a valve closure arrangement for damping a flow of hydraulic medium through said apertures, said valve carrier being integrated captively into said coupler and mounted in a fixed position relative thereto, whereby correct assembly of said hydraulic circuit is facilitated.

\* \* \* \* \*